(12) United States Patent
Erdl et al.

(10) Patent No.: US 11,046,245 B2
(45) Date of Patent: Jun. 29, 2021

(54) MOTOR VEHICLE COMPRISING A LIGHTING MODULE FOR GENERATING A SYMBOL

(71) Applicant: Bayerische Motoren Werke Aktiengesellschaft, Munich (DE)

(72) Inventors: Helmut Erdl, Flintsbach (DE); Abdelmalek Hanafi, Munich (DE); Thomas Hausmann, Munich (DE); Lenja Sorokin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/562,606

(22) Filed: Sep. 6, 2019

(65) Prior Publication Data

US 2019/0389373 A1    Dec. 26, 2019

Related U.S. Application Data

(63) Continuation of application No. PCT/EP2018/054129, filed on Feb. 20, 2018.

(30) Foreign Application Priority Data

Mar. 9, 2017   (DE) .................... 10 2017 203 893.4

(51) Int. Cl.
*B60Q 3/80* (2017.01)
*F21S 41/16* (2018.01)
*B60Q 1/00* (2006.01)

(52) U.S. Cl.
CPC ............. *B60Q 3/80* (2017.02); *B60Q 1/0035* (2013.01); *F21S 41/16* (2018.01); *B60Q 2400/50* (2013.01)

(58) Field of Classification Search
CPC .... G03B 21/14; G03B 21/145; G03B 21/147; G03B 21/208; G03B 21/562;
(Continued)

(56) References Cited

U.S. PATENT DOCUMENTS 10,220,771 B2    3/2019  Krahnstoever
2008/0187012 A1*  8/2008  Yamauchi ............ H04N 9/3161
                                                            372/26
(Continued)

FOREIGN PATENT DOCUMENTS

DE    10 2005 013 335 A1    10/2006
DE    10 2006 050 546 A1    4/2008
(Continued)

OTHER PUBLICATIONS

International Search Report (PCT/ISA/210) issued in PCT Application No. PCT/EP2018/054129 dated Jun. 19, 2018 with English translation (seven pages).
(Continued)

*Primary Examiner* — Sultan Chowdhury
(74) *Attorney, Agent, or Firm* — Crowell & Moring LLP

(57) ABSTRACT

A motor vehicle includes a lighting module that generates a symbol on the ground in the surroundings of the motor vehicle, a surrounding sensor system that detects sensor information in a region in the surroundings of the motor vehicle, and a controller designed to control the lighting module depending on the sensor information such that the symbol is generated automatically by the lighting module in a ground region between the motor vehicle and another road user as soon as the distance between the motor vehicle and the other road user falls below a specified threshold according to the sensor information.

16 Claims, 1 Drawing Sheet

(58) Field of Classification Search
CPC ........ G03B 21/2053; B60Q 3/14; B60Q 3/16; B60Q 3/64; B60Q 3/68; B60Q 3/74; B60Q 3/80; B60Q 1/02; B60Q 1/04; B60Q 1/24; B60Q 1/26; B60Q 1/50; B60Q 1/0035
See application file for complete search history.

(56) References Cited

U.S. PATENT DOCUMENTS

| | | | |
|---|---|---|---|
| 2014/0049384 A1 | 2/2014 | Mueller | |
| 2014/0320823 A1* | 10/2014 | Ammar | B60Q 1/0023 353/13 |
| 2016/0059771 A1 | 3/2016 | Meinzer et al. | |
| 2016/0144785 A1* | 5/2016 | Shimizu | B60K 35/00 340/435 |
| 2017/0210282 A1* | 7/2017 | Rodriguez Barros | B60Q 1/484 |
| 2018/0174450 A1* | 6/2018 | Im | G08G 1/0112 |
| 2019/0051233 A1* | 2/2019 | Kweon | G02B 19/0014 |

FOREIGN PATENT DOCUMENTS

| | | |
|---|---|---|
| DE | 10 2006 050 548 A1 | 4/2008 |
| DE | 10 2009 009 472 A1 | 8/2010 |
| DE | 10 2013 211 877 A1 | 1/2015 |
| DE | 10 2015 200 131 A2 | 7/2016 |
| DE | 10 2015 200 132 A1 | 7/2016 |
| DE | 10 2015 201 764 A1 | 8/2016 |
| DE | 10 2015 201 766 A1 | 8/2016 |
| DE | 10 2015 201 767 A1 | 8/2016 |
| DE | 10 2015 011 231 A1 | 3/2017 |
| EP | 0 856 431 A1 | 8/1998 |
| EP | 3 135 537 A1 | 3/2017 |
| EP | 3 216 650 A1 | 9/2017 |
| GB | 2517790 A | 3/2015 |
| JP | 2016-88397 A | 5/2016 |
| JP | 2016-107775 A | 6/2016 |

OTHER PUBLICATIONS

German-language Written Opinion (PCT/ISA/237) issued in PCT Application No. PCT/EP2018/054129 dated Jun. 19, 2018 (six pages).

German-language Search Report issued in counterpart German Application No. 10 2017 203 893.4 dated Nov. 8, 2017 with partial English translation (11 pages).

German-language Examination Report issued in European Application No. 18 708 070.0 dated Feb. 25, 2021 (six (6) pages).

* cited by examiner

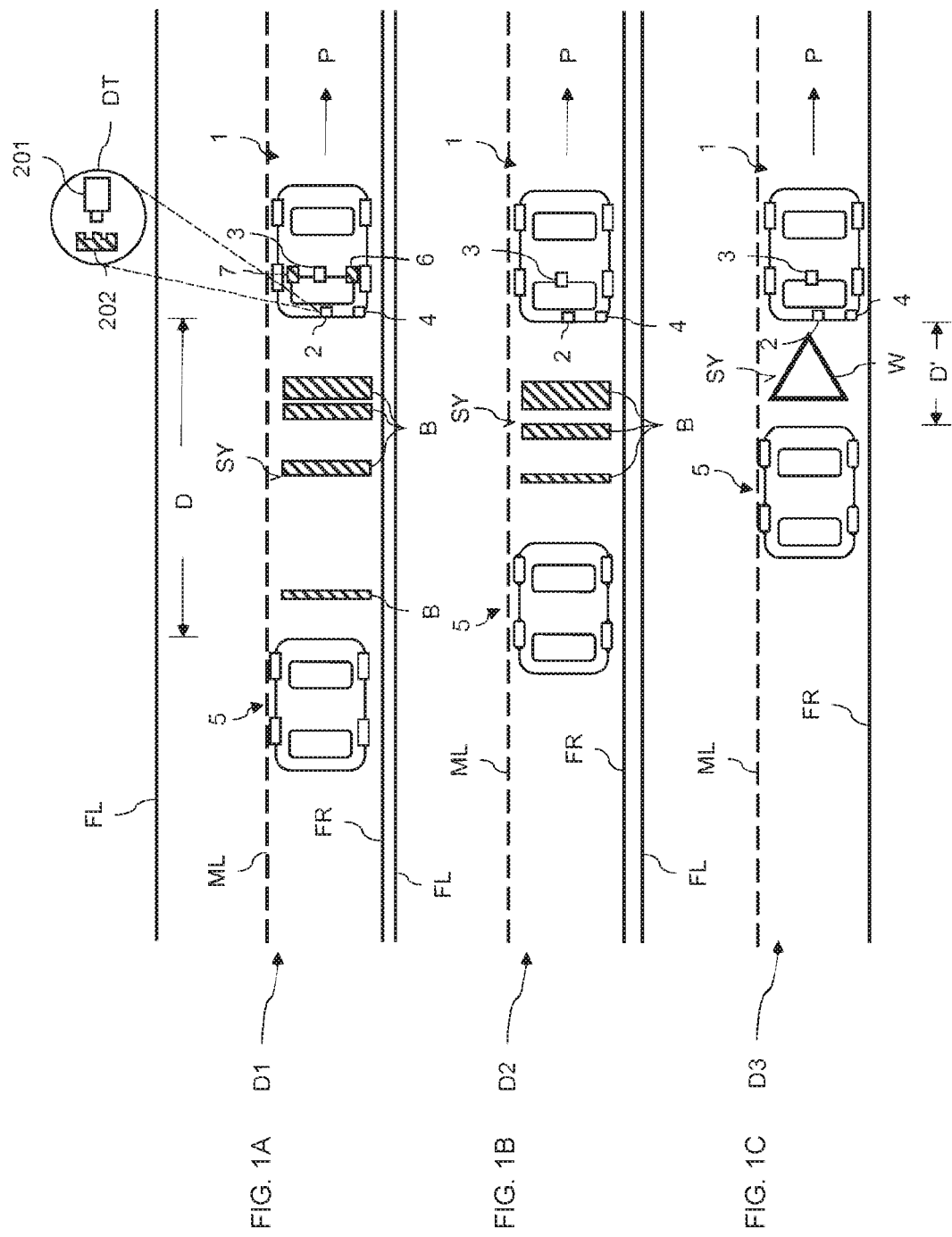

MOTOR VEHICLE COMPRISING A LIGHTING MODULE FOR GENERATING A SYMBOL

CROSS REFERENCE TO RELATED APPLICATIONS

This application is a continuation of PCT International Application No. PCT/EP2018/054129, filed Feb. 20, 2018, which claims priority under 35 U.S.C. § 119 from German Patent Application No. 10 2017 203 893.4, filed Mar. 9, 2017, the entire disclosures of which are herein expressly incorporated by reference.

BACKGROUND AND SUMMARY OF THE INVENTION

The invention relates to a motor vehicle comprising a lighting module for generating a symbol.

Lighting modules for motor vehicles with which symbols are displayed on the ground in the area surrounding the motor vehicle are known from the prior art. For example, document DE 10 2013 211 877 A1 discloses a motor vehicle comprising a projection module made up of an array of projection optics. A distribution of light in the form of a carpet of light is generated in the area surrounding the motor vehicle and, in particular, next to the entry doors by way of this projection module.

To date, no attempts have been made to use lighting modules which serve, in a motor vehicle, for generating a symbol on the ground in the area surrounding the motor vehicle in a suitable manner to increase road safety.

The object of the invention is therefore to provide a motor vehicle comprising a lighting module for generating a symbol on the ground, wherein road safety is improved by the lighting module.

This object is achieved by the motor vehicle according to patent claim 1. Developments of the invention are defined in the dependent claims.

The motor vehicle according to the invention, which may be a manually controlled vehicle or an autonomously or partially autonomously driving vehicle, comprises a lighting module for generating a symbol on the ground in the area surrounding the motor vehicle. The lighting module can be designed, for example, as a projection module which projects the symbol onto the ground in the area surrounding the motor vehicle. The motor vehicle further comprises a surrounding area sensor system for detecting sensor information in a region in the area surrounding the motor vehicle. Depending on the design, this surrounding area sensor system can contain one or more cameras and/or one or more lidar devices and/or one or more radar devices and/or possibly other types of sensors too.

A control device is provided in the motor vehicle, which control device is designed to control the lighting module depending on the sensor information of the surrounding area sensor system in such a way that the symbol is automatically generated by the lighting module in a ground region between the motor vehicle and another road user as soon as the distance between the motor vehicle and the other road user undershoots a predetermined threshold in accordance with the sensor information. In other words, the distance between the motor vehicle and the other road user is extracted or read out from the sensor information and this information is used to trigger reproduction of a symbol when a distance threshold is undershot.

According to the invention, the symbol generated by the lighting module can be configured in any desired manner with one or more symbols and contain different symbols and in particular also letters and/or numbers. Depending on the variant, the symbol can possibly have different colors or color mixtures. In particular, the symbol can also be white. The control device used in the motor vehicle according to the invention can be integrated into a single control unit or into a single controller. The control unit can optionally also be distributed between a plurality of control units or controllers.

The term "road user" includes any vehicles involved in road traffic, such as motor vehicles, that is to say passenger cars, trucks, motorcycles and the like, for example, and also vehicles which are driven without a motor, such as bicycles, for example. Furthermore, the term "road user" also comprises pedestrians. Where perception or visibility of the symbol by the other road users is mentioned in the text which follows, this is intended to be understood to mean, in the case of a vehicle, perception by a person who is located in or on the motor vehicle.

The motor vehicle according to the invention can optionally also include a plurality of the above-described lighting modules comprising a correspondingly associated control device. In a preferred variant, the lighting module is a single unit in which the control device may optionally be integrated too. Nonetheless, the lighting module can optionally comprise a plurality of separate submodules in different installation positions on the motor vehicle.

The motor vehicle according to the invention has the advantage that other road users or optionally the driver of the motor vehicle himself can easily and intuitively be made aware that a minimum distance is not being complied with by virtue of the generation of a symbol on the ground. Road safety is increased in this way.

In a preferred variant, the predetermined threshold, the symbol being generated when the predetermined threshold is undershot, is 200 m or less. An adequate minimum distance between the motor vehicle and the other road user is ensured in this way.

In a further preferred variant, the lighting module comprises a coherent light source, in particular a laser light source, the symbol being generated on the ground by the light of the light source. In this case, the maximum power of the coherent light source is preferably between 50 mW and 3 W. Owing to the use of a laser light source, the symbol can also be displayed when there are large distances between the motor vehicle and the other road user.

In a particularly preferred variant of the embodiment just described, the lighting module comprises one or more holographic-optical elements onto which the light of the coherent light source falls, wherein the holographic-optical element or elements is/are substantially non-absorbent to the light of the coherent light source, and wherein the holographic-optical element or elements is/are designed to create interference in the light of the coherent light source by phase modulation thereof in order to generate the symbol. Holographic-optical elements are known per se from the prior art and can be realized, for example, as diffractive optical elements. They are distinguished in that the structures for deflecting the light are situated in the range of its wavelength, so that diffraction effects occur. Owing to the use of non-absorbent holographic-optical elements, a low level of light loss and therefore a high range are ensured in this case, so that the symbol can also be produced at a great distance from the motor vehicle. In this case, the term "non-absorbent" is intended to be understood to mean that the light of the coherent light source has an intensity of 95% or more, and in particular of 99% or more, and particularly preferably of 100%, after passing the holographic-optical element or elements in comparison to the intensity before passing the holographic-optical element or elements. Depending on the embodiment, the holographic-optical elements can respectively be reflective or transmissive elements.

In a further preferred embodiment, the lighting module is a scanning lighting module which generates the symbol on the ground via a scanning movement of a light spot. This scanning lighting apparatus allows the generated symbol to be varied in a simple manner.

In a preferred refinement of the motor vehicle according to the invention, the lighting module and the surrounding area sensor system are installed in the motor vehicle in such a way that the lighting module emits light into the rear region of the motor vehicle and the surrounding area sensor system detects sensor information in the rear region of the motor vehicle, wherein the rear region is situated behind the motor vehicle with respect to the longitudinal direction of the motor vehicle. In this case, the symbol is preferably generated by monochromatic light and in particular red light. The symbol therefore generally corresponds to the color of the taillights of the motor vehicle. In a preferred variant, the symbol is generated only for those other road users which are at least partially situated to the rear in the space between the extrapolations of the two longitudinal sides of the motor vehicle when the respective distance of the road users from the motor vehicle undershoots a threshold. Therefore, only road users situated directly behind the motor vehicle are taken into consideration when generating the symbol.

In a further preferred variant of the motor vehicle according to the invention, the lighting module and the surrounding area sensor system are installed in the motor vehicle in such a way that the lighting module emits light into the front region of the motor vehicle and the surrounding area sensor system detects sensor information in the front region of the motor vehicle, wherein the front region is situated in front of the motor vehicle with respect to the longitudinal direction of the motor vehicle. In this case, the symbol is preferably generated only for those other road users which are at least partially situated to the front in the space between the extrapolations of the two longitudinal sides of the motor vehicle when the respective distance of the road users from the motor vehicle undershoots a threshold. Accordingly, the symbol is generated only for road users situated directly in front of the motor vehicle according to the invention.

In a further preferred variant of the motor vehicle according to the invention, the control device is designed to control the lighting module in such a way that, in the event of the distance between the motor vehicle and the other road user undershooting the predetermined threshold, the generated symbol, in particular the color and/or brightness and/or position and/or shape of the symbol, is changed depending on the size of this distance. The symbol is therefore matched to a change in this distance in a variable manner.

In a preferred refinement, the brightness of the symbol on the ground is increased as the distance between the motor vehicle and the other road user becomes smaller, as a result of which the ability of the symbol to be perceived by the other road user and, respectively, the driver of the motor vehicle is increased and therefore road safety is further improved.

In a further preferred embodiment, the symbol generated on the ground comprises a plurality of individual elements, wherein the distance between the individual elements is reduced as the distance between the motor vehicle and the other road user becomes smaller. In this way, the variation in the distance is intuitively imparted to the driver of the motor vehicle and, respectively, to the other road user. The individual elements preferably comprise a plurality of bars which are arranged offset in relation to one another in the longitudinal direction of the motor vehicle. The bars are, in particular, straight bars and/or bent bars in the form of arrowheads, wherein the arrowheads of the bent bars are preferably directed toward the motor vehicle according to the invention or away from the motor vehicle. In this way, a relationship between the motor vehicle and the other road user is imparted by the symbol.

In a further preferred embodiment, the control device is designed to control the lighting module in such a way that, in the event of the distance between the motor vehicle and the other road user undershooting a limit value smaller than the predetermined threshold, a warning message is output as the symbol. In this case, a warning message is intended to be understood to mean one or more symbols (optionally also textual symbols) which are immediately interpreted by people as an indication of a hazard. In this way, the driver of the motor vehicle and, respectively, the other road user are once again warned of an impact in a dedicated manner.

In a further variant, the motor vehicle according to the invention comprises a display which is visible to the other road user, wherein the control device is further designed to control the display in such a way that, in the event of the distance between the motor vehicle and the other road user undershooting a limit smaller than the predetermined threshold, a warning message is generated on the display. Analogously to the above warning message, this warning message is one or more symbols which are immediately interpreted by people as an indication of a hazard. In this variant of the invention, an additional warning is once again provided by means of a separate display.

In a further variant, the motor vehicle according to the invention comprises a camera for recording the other road user, wherein the control device is further designed to control the camera in such a way that, in the event of the distance between the motor vehicle and the other road user undershooting a threshold value smaller than the predetermined threshold, the camera records an image of the other road user. Traffic infringements can be detected in a suitable manner in this way.

The values for the above-described limit value, the above-described limit and the above-described threshold value can be defined to be of equal magnitude or else of different magnitude.

In a further variant, the control device of the motor vehicle according to the invention is configured in such a way that it defines the magnitude of the predetermined threshold depending on one or more parameters relating to the motor vehicle and/or the area surrounding the motor vehicle.

In one refinement, the parameter or parameters comprises/comprise the speed of the motor vehicle. In this case, the greater the speed of the motor vehicle, the larger the predetermined threshold is preferably defined to be. For example, the threshold at a speed value in km/h can be set to half the value in meters.

As an alternative or in addition, the parameter or parameters comprises/comprise the speed of the other road user, wherein the greater the speed of the other road user, the larger this threshold is preferably defined to be.

In a further variant, the parameter or parameters comprises/comprise the grip of the motor vehicle on the ground, wherein the lower the grip, the greater the predetermined threshold is preferably defined to be.

In a further variant, the parameter or parameters comprises/comprise the range of vision in the area surrounding the motor vehicle, wherein the smaller the range of vision, the larger the predetermined threshold is preferably defined to be.

In a further embodiment, the parameter or parameters comprises/comprise the volume of traffic in the area surrounding the motor vehicle, wherein the greater the volume of traffic, the larger the predetermined threshold is preferably defined to be.

In a further embodiment, the parameter or parameters comprises/comprise a currently valid traffic regulation on the stretch of road on which the motor vehicle is located, in particular a traffic regulation which defines a minimum distance, wherein the threshold is set to the minimum distance in this case.

Corresponding variables which represent the abovementioned parameters are known per se. Depending on the design, the parameters can be detected in different ways. In particular, a sensor system in the motor vehicle can be used for this purpose, or the parameters can optionally also be received via a communication interface in the motor vehicle, in particular a wireless communication interface. In particular, car-to-car and/or car-to-X communication can be used for this purpose.

Other objects, advantages and novel features of the present invention will become apparent from the following detailed description of one or more preferred embodiments when considered in conjunction with the accompanying drawing.

BRIEF DESCRIPTION OF THE DRAWING

FIGS. 1A-1C show three schematic plan views which illustrate the generation of a symbol by the motor vehicle according to the invention.

DETAILED DESCRIPTION OF THE DRAWING

FIGS. 1A-1C show, in three plan views D1, D2 and D3, a scenario in which an embodiment of a motor vehicle according to the invention generates a symbol for warning a motor vehicle traveling behind the motor vehicle according to the invention. The motor vehicle according to the invention is denoted by reference symbol 1 in the figures and the direction of travel of this motor vehicle is indicated by the arrow P. A lighting module 2 and also a surrounding area sensor system 4 in the form of a camera are installed on the rear side of the motor vehicle. In this case, the lighting module is controlled by a control device 3. The lighting module, the control device and the surrounding area sensor system are merely schematically reproduced by white rectangles. The motor vehicle can optionally comprise a further camera 6 which is directed to the rear and also a display 7 which is directed to the rear. The camera and the display are also only schematically indicated by hatched rectangles, wherein the camera and the display are illustrated only in the plan view D1 for reasons of clarity.

The plan view D1 of FIG. 1A further shows a schematic view of a detail DT of the lighting module 2. According to this view of a detail, the lighting module comprises a monochromatic laser light source 201 and also a plurality of holographic-optical elements 202, only one of which is shown. In this case, the holographic-optical elements 202 are movable, so that the laser light can fall on two different holographic-optical elements. The holographic-optical elements are furthermore transmissive and the light of the laser source 201 falling on them is phase-modulated with the respective holographic-optical element, so that a symbol is generated on the ground behind the motor vehicle. This symbol is denoted by reference symbol SY in each of the plan views D1 to D3.

In all of the plan views D1 to D3 of FIGS. 1A-1C, the motor vehicle 1 is located on the right-hand-side lane of a carriageway, wherein the carriageway is represented by the right-hand-side carriageway edge FR, the center line ML and the left-hand-side carriageway edge FL. A further motor vehicle 5 approaches the motor vehicle 1 from the rear, wherein the distance of the motor vehicle 5 from the motor vehicle 1 is becoming ever smaller from the plan view D1 to the plan view D3. In this case, a distance warning system is provided by way of the lighting module 2 in combination with the control device 3 and the surrounding area sensor system 4, the motor vehicle 1 warning the rear motor vehicle 5 of an excessively small safety distance by way of the distance warning system. To this end, a first distance threshold value D and a second distance threshold value D' are stored in the control device 3.

In the scenario of plan view D1, the vehicle 5 is currently undershooting the first distance threshold value D. This situation of the distance threshold value being undershot is ascertained by an evaluation of the data of the surrounding area sensor system 4. The evaluation is carried out by the control device 3 which has access to the sensor data of the surrounding area sensor system. According to the plan view D1, four bars B which run transversely in relation to the carriageway are reproduced between the motor vehicle 1 and the motor vehicle 5 as symbol SY. If the distance between the motor vehicle 1 and the motor vehicle 5 continues to decrease, the bars B are moved closer to one another, i.e., the distances between the bars are reduced, this being indicated in plan view D2. In this case, the reduction leads to the two bars which are situated closest to the motor vehicle 1 merging with one another. In this case, the change in the symbol can be achieved by using a different holographic-optical element 202 in the lighting module 2. Owing to the reduction in the distance between the bars, the reduction in the distance from the motor vehicle 1 traveling ahead is indicated to the driver of the motor vehicle 5 in an intuitively and readily perceptible manner.

In the plan view of D3, the second distance threshold value D' between the motor vehicle 1 and the motor vehicle 5 is finally undershot. Since there is now an immediate risk of collision between the motor vehicle 1 and the motor vehicle 5, the symbol SY is changed to the effect that a warning symbol W in the form of a warning triangle is output on the ground between the motor vehicle 1 and the motor vehicle 5. In this way, the driver of the motor vehicle 5 is once again particularly clearly made aware of the situation of the safety distance D' being undershot. In addition, a warning message can optionally be output by the optional display 6 when the distance D' is undershot. Furthermore, it is also possible for an image of the motor vehicle 5 to be recorded by the optional camera 7 in order to detect a traffic infringement in this way. This image information can optionally be passed to a police authority.

In one variant of the above-described embodiment, the brightness of the symbol SY is increased as the distance between the motor vehicle 1 and the motor vehicle 5 decreases. Furthermore, as an alternative or in addition, a corresponding lighting module comprising a surrounding area sensor system and a control device can be installed in the front of the motor vehicle in order to in this way generate a symbol between the motor vehicle 1 and a vehicle traveling ahead when a safety distance is undershot. The symbol, which is located behind the motor vehicle 1 in FIGS. 1A-1C, is preferably generated using a red laser light source, so that the symbol is in the same color as the taillights of the motor vehicle. In contrast to this, an RGB laser light source is preferably used in the event of a symbol being generated in front of the motor vehicle 1, so that the symbol appears in the color white and therefore corresponds to the color of the headlamps of the motor vehicle.

The embodiments of the invention described above have a range of advantages. In particular, a distance warning system is provided in a simple manner by way of a lighting module generating a corresponding symbol on the ground between two vehicles when a safety distance is undershot. In this case, the symbol can be adapted depending on a change in the distance, in order to improve the warning effect in this way. In particular, a special warning symbol can be output if the distance between the motor vehicles becomes very small. In this case, an additional warning can supplementarily be output by a display or the approaching vehicle can be photographed for the purpose of detecting traffic offences.

LIST OF REFERENCE SYMBOLS

1 Motor vehicle
2 Lighting module
201 Laser light source
202 Holographic-optical element
3 Control device
4 Surrounding area sensor system
5 Motor vehicle
6 Display
7 Camera
SY Symbol
B Bar
W Warning symbol
FR Right-hand-side carriageway edge
FL Left-hand-side carriageway edge
ML Center line
P Direction of travel
D, D' Distance threshold values
D1, D2, D3 Plan views
DT View of a detail The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle comprising:
a lighting module configured to generate a symbol on the ground in an area surrounding the motor vehicle;
a surrounding area sensor system configured to detect sensor information in a region in the area surrounding the motor vehicle;
a control device configured to control the lighting module depending on the sensor information such that the symbol is automatically generated by the lighting module in a ground region between the motor vehicle and a road user as soon as a distance between the motor vehicle and the road user undershoots a predetermined threshold based on the sensor information;
wherein the control device is configured to control the lighting module such that, when the distance between the motor vehicle and the road user undershoots the predetermined threshold, at least one of a color, a brightness, a position, and a shape of the symbol is changed depending on the distance.

2. The motor vehicle according to claim 1, wherein the lighting module comprises a laser light source, the symbol being generated on the ground by light of the laser light source.

3. The motor vehicle according to claim 2, wherein the lighting module comprises a holographic-optical element onto which the light of the laser light source falls, wherein the holographic-optical element is substantially non-absorbent to the light of the laser light source, and wherein the holographic-optical element is configured to generate the symbol.

4. The motor vehicle according to claim 1, wherein the lighting module and the surrounding area sensor system are installed in the motor vehicle such that the lighting module emits light into a rear region of the motor vehicle and the surrounding area sensor system detects sensor information in the rear region of the motor vehicle, wherein the rear region is situated behind the motor vehicle with respect to a longitudinal direction of the motor vehicle, wherein the symbol is generated only in the rear region of the motor vehicle in a space between extrapolations of two longitudinal sides of the motor vehicle.

5. The motor vehicle according to claim 1, wherein the lighting module and the surrounding area sensor system are installed in the motor vehicle such that the lighting module emits light into a front region of the motor vehicle and the surrounding area sensor system detects sensor information in the front region of the motor vehicle, wherein the front region is situated in front of the motor vehicle with respect to a longitudinal direction of the motor vehicle, wherein the symbol is generated only in the front region of the motor vehicle in a space between extrapolations of two longitudinal sides of the motor vehicle.

6. The motor vehicle according to claim 1, wherein the brightness of the symbol on the ground is increased as the distance between the motor vehicle and the road user becomes smaller.

7. The motor vehicle according to claim 1, wherein the symbol comprises a plurality of individual elements, wherein a distance between the individual elements is reduced as the distance between the motor vehicle and the road user becomes smaller.

8. The motor vehicle according to claim 7, wherein the individual elements comprise a plurality of bars which are arranged offset in relation to one another in a longitudinal direction of the motor vehicle, wherein the plurality of bars include at least one of straight bars and bent bars in a form of arrowheads, wherein the arrowheads of the bent bars are directed toward the motor vehicle or away from the motor vehicle.

9. The motor vehicle according to claim 1, wherein the control device is configured to control the lighting module such that, when the distance between the motor vehicle and the road user undershoots a limit value smaller than the predetermined threshold, a warning message is output as the symbol.

10. The motor vehicle according to claim 1, further comprising a display which is visible to the road user, wherein the control device is further configured to control the display such that, when the distance between the motor vehicle and the road user undershoots a limit value smaller than the predetermined threshold, a warning message is generated on the display.

11. The motor vehicle according to claim 1, further comprising a camera configured to record the road user, wherein the control device is further configured to control the camera such that, when the distance between the motor vehicle and the road user undershoots a threshold value smaller than the predetermined threshold, the camera records an image of the road user.

12. The motor vehicle according to claim 2, wherein the lighting module and the surrounding area sensor system are installed in the motor vehicle such that the lighting module emits light into a rear region of the motor vehicle and the surrounding area sensor system detects sensor information in the rear region of the motor vehicle, wherein the rear region is situated behind the motor vehicle with respect to a longitudinal direction of the motor vehicle, wherein the symbol is generated only in the rear region of the motor vehicle in a space between extrapolations of two longitudinal sides of the motor vehicle.

13. The motor vehicle according to claim 2, wherein the lighting module and the surrounding area sensor system are installed in the motor vehicle such that the lighting module emits light into a front region of the motor vehicle and the surrounding area sensor system detects sensor information in the front region of the motor vehicle, wherein the front region is situated in front of the motor vehicle with respect to a longitudinal direction of the motor vehicle, wherein the symbol is generated only in the front region of the motor vehicle in a space between extrapolations of two longitudinal sides of the motor vehicle.

14. The motor vehicle according to claim 2, wherein the control device is configured to control the lighting module such that, when the distance between the motor vehicle and the road user undershoots the predetermined threshold, at least one of a color, a brightness, a position, and a shape of the symbol is changed depending on the distance.

15. The motor vehicle according to claim 6, wherein the symbol comprises a plurality of individual elements, wherein a distance between the individual elements is reduced as the distance between the motor vehicle and the road user becomes smaller.

16. A motor vehicle comprising:
a lighting module configured to generate a symbol on the ground in an area surrounding the motor vehicle;
a surrounding area sensor system configured to detect sensor information in a region in the area surrounding the motor vehicle;
a control device configured to control the lighting module depending on the sensor information such that the symbol is automatically generated by the lighting module in a ground region between the motor vehicle and a road user as soon as a distance between the motor vehicle and the road user undershoots a predetermined threshold based on the sensor information;
wherein the control device is configured to define the predetermined threshold depending on a parameter relating to at least one of the motor vehicle and the area surrounding the motor vehicle.

* * * * *